United States Patent
Carmi et al.

(10) Patent No.: US 9,911,257 B2
(45) Date of Patent: Mar. 6, 2018

(54) MODELED PHYSICAL ENVIRONMENT FOR INFORMATION DELIVERY

(75) Inventors: Eitan Carmi, Ra'anana (IL); Rafi Blumenfeld, Ra'anana (IL); Tali Segall, Tel Aviv (IL)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 815 days.

(21) Appl. No.: 13/528,339

(22) Filed: Jun. 20, 2012

(65) Prior Publication Data

US 2012/0330623 A1    Dec. 27, 2012

Related U.S. Application Data

(60) Provisional application No. 61/500,932, filed on Jun. 24, 2011.

(51) Int. Cl.
  *G06G 7/48*  (2006.01)
  *G07C 9/00*  (2006.01)
  (Continued)

(52) U.S. Cl.
  CPC ....... *G07C 9/00103* (2013.01); *G06Q 10/087* (2013.01); *G06Q 50/163* (2013.01)

(58) Field of Classification Search
  CPC .......... G06F 3/04815; G06F 17/30214; G06F 17/30247; G06F 17/30873; G06F 17/30994; G06T 17/05; G06T 19/003
  (Continued)

(56) References Cited

U.S. PATENT DOCUMENTS 6,971,063 B1 * 11/2005 Rappaport et al. ........... 715/733
2003/0081010 A1 * 5/2003 An Chang et al. ........... 345/835
(Continued)

FOREIGN PATENT DOCUMENTS

JP    2001306945 A    11/2001
JP    2002092126 A     3/2002
(Continued)

OTHER PUBLICATIONS

AutoCAD Civil 3D 2010, User's Guide, Autodesk ®, Apr. 2009.*
(Continued)

*Primary Examiner* — Kandasamy Thangavelu

(57) ABSTRACT

Systems and methods for producing an access-controlled three-dimensional environment of a facility and its assets. A method performed by an environment management system (EMS) includes receiving, from a client system, user credentials, and validating the user credentials. The method includes retrieving user-specific data corresponding to the validated user credentials and transmitting three-dimensional (3D) environment data to the client system based on the validated user credentials and the user-specific data. The method includes receiving a request for information regarding an asset of the 3D environment data and determining additional environment data on an enterprise server system (ESS) that corresponds to the received request. The method includes transmitting, to the client system, a reference to the additional environment data on the ESS. The client system can then use the reference to retrieve the additional environment data from the ESS for display on the client system.

21 Claims, 5 Drawing Sheets

(51) Int. Cl.
*G06Q 10/08* (2012.01)
*G06Q 50/16* (2012.01)

(58) Field of Classification Search
USPC ............... 703/6, 1; 707/3, 626; 348/159; 345/419; 715/33, 757; 700/97; 340/825.49, 602, 825, 49
See application file for complete search history.

(56) References Cited

U.S. PATENT DOCUMENTS

| | | | |
|---|---|---|---|
| 2005/0278047 A1* | 12/2005 | Ahmed | 700/97 |
| 2005/0285748 A1* | 12/2005 | Pedraza et al. | 340/602 |
| 2006/0190285 A1* | 8/2006 | Harris et al. | 705/1 |
| 2007/0075995 A1* | 4/2007 | Reichard et al. | 345/419 |
| 2008/0033641 A1* | 2/2008 | Medalia | 701/209 |
| 2008/0288220 A1* | 11/2008 | Dillenberger et al. | 703/1 |
| 2009/0019367 A1 | 1/2009 | Cavagnari et al. | |
| 2009/0094556 A1* | 4/2009 | Howard et al. | 715/848 |
| 2009/0299960 A1* | 12/2009 | Lineberger | 707/3 |
| 2010/0066559 A1* | 3/2010 | Judelson | 340/825.49 |
| 2010/0122196 A1 | 5/2010 | Wetzer et al. | |
| 2010/0234104 A1 | 9/2010 | Ruppert et al. | |
| 2010/0257464 A1* | 10/2010 | Renner | 715/757 |
| 2012/0066178 A1* | 3/2012 | Omansky et al. | 707/626 |
| 2012/0281095 A1* | 11/2012 | Trenciansky et al. | 348/159 |

FOREIGN PATENT DOCUMENTS

| | | |
|---|---|---|
| JP | 2002185981 A | 6/2002 |
| JP | 2005242606 A | 9/2005 |
| WO | 2005111815 A1 | 11/2005 |
| WO | 2009140386 A1 | 11/2009 |

OTHER PUBLICATIONS

Learning Google Earth: Placemarks and Tours, Google Earth Official Channel, http://www.youtube.com/watch?v=WqDQec1itqg, Uploaded: Aug. 19, 2010.*

Surveillance DVR Remote Live View & Playback, CCTV Camera Pros, http://www.cctvcamerapros.com/Surveillance-DVR-Remote-View-Playback-s/367.htm, Apr. 30, 2010.*

PCT Search Report and Written Opinion dated Jan. 7, 2013 for PCT Application No. PCT/US2012/43431.

JP Decision for Registration dated Jun. 29, 2016, for JP Application No. 2014-517136, 2 pages.

Hiura et al., "Proposal of Situation-Adaptive Pedestrian Navigation System with Virtual Space", 15th Data Engineering Workshop (DEWS2004) [online], Japan, IEICE Data Engineering Research Committee, Jun. 18, 2004, in Japanese with English abstract, 6 pages.

Office Action from the Japanese Patent Office dated Mar. 7, 2016, for JP Application No. 2014-517136, 4 pages.

* cited by examiner

MODELED PHYSICAL ENVIRONMENT FOR INFORMATION DELIVERY

CROSS-REFERENCE TO RELATED APPLICATION

This application claims the benefit of the filing date of U.S. Provisional Patent Application 61/500,932, filed Jun. 24, 2011, which is hereby incorporated by reference.

TECHNICAL FIELD

The present disclosure is directed, in general, to systems and methods for data management, delivery, and display.

BACKGROUND OF THE DISCLOSURE

It is desirable to provide information to individuals in a manner that is intuitive and convenient.

SUMMARY OF THE DISCLOSURE

Various embodiments disclosed herein include systems and methods for data management, delivery, and display. In particular, various embodiments include systems that can display modeled physical and geographical environments with context-specific information available to users. Embodiments include systems and methods for producing an access-controlled three-dimensional environment of a facility and its assets.

In one example, the system can provide a geographic map and modeled physical environment of a factory, workspace, other building or location, or any other assets such as electricity lines, railway gantries, railroads, etc., including workstations, desks, machinery, and other elements, where relevant information related to each element can be accessed by clicking or otherwise selecting indicators in the modeled environment.

In various embodiments, a method performed by an environment management system (EMS) includes receiving, from a client system, user credentials, and validating the user credentials. The method includes retrieving user-specific data corresponding to the validated user credentials and transmitting three-dimensional (3D) environment data to the client system based on the validated user credentials and the user-specific data. The method includes receiving a request for information regarding an asset of the 3D environment data and determining additional environment data on an enterprise server system (ESS) that corresponds to the received request. The method includes transmitting, to the client system, a reference to the additional environment data on the ESS. The client system can then use the reference to retrieve the additional environment data from the ESS for display on the client system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5 and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Many businesses and enterprises maintain physical facilities in various geographical locations or regions. For example, an automobile manufacturer may have several different plants that each manufacture or assemble certain components of the automobile, and may have other plants that assemble the vehicle as a whole. Alternately, a power generator may have physical infrastructure spread out over a wide region, for example including various wind farms, electrical grid lines, etc.

Disclosed embodiments provide an intuitive way for businesses and users to examine, retrieve, and review information related to physical assets in a three-dimensional simulated environment.

Figure 1:
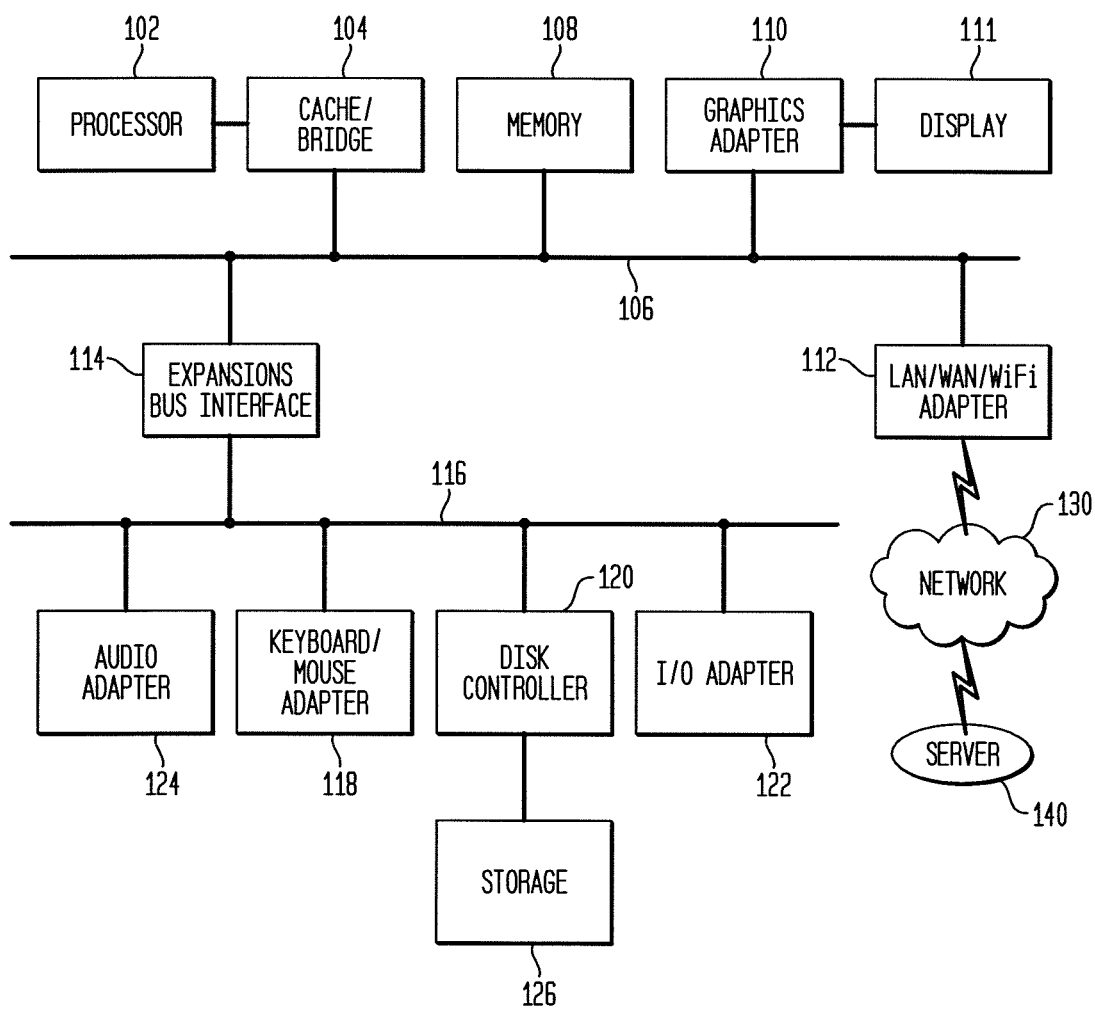
FIG. 1 depicts a block diagram of a data processing system in which an embodiment can be implemented.

FIG. 1 depicts a block diagram of a data processing system in which an embodiment can be implemented, as one or more of the systems described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response. Such operating system could also be the iOS operating system of Apple Computer, Inc., could have single or multiple windows, and could operate without a cursor.

One of various operating systems, such as a version of Microsoft Windows™, a product of Microsoft Corporation located in Redmond, Wash., or others, may be employed.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In particular, server system 140 can act as a server for the GIS and system-status content described below, and can deliver this information to client systems using processes as described herein.

Various embodiments include systems and methods to visualize 3D facilities and assets in a 3D environment, including in a geographical information system (GIS) context in some cases. For a given facility, the system can display (or cause to be displayed) both the outdoor and the indoor of the facilities, and various aspects can be shown or hidden by user selection, to allow more, less, or specific detail to be displayed. Note that, as used herein and unless otherwise specifically indicated "displaying" and similar terms includes displaying on the system being described itself, and also includes sending appropriate data so that the display is presented on another system such as a client data processing system. In addition to the facility itself, the information from various sources can be associated and navigated with assistance of 3D identification in the 3D environment. When "the system" is used generically herein, it indicates operations and features of the various different systems shown in FIG. 2, taken as a whole, unless otherwise specified.

Figure 2:
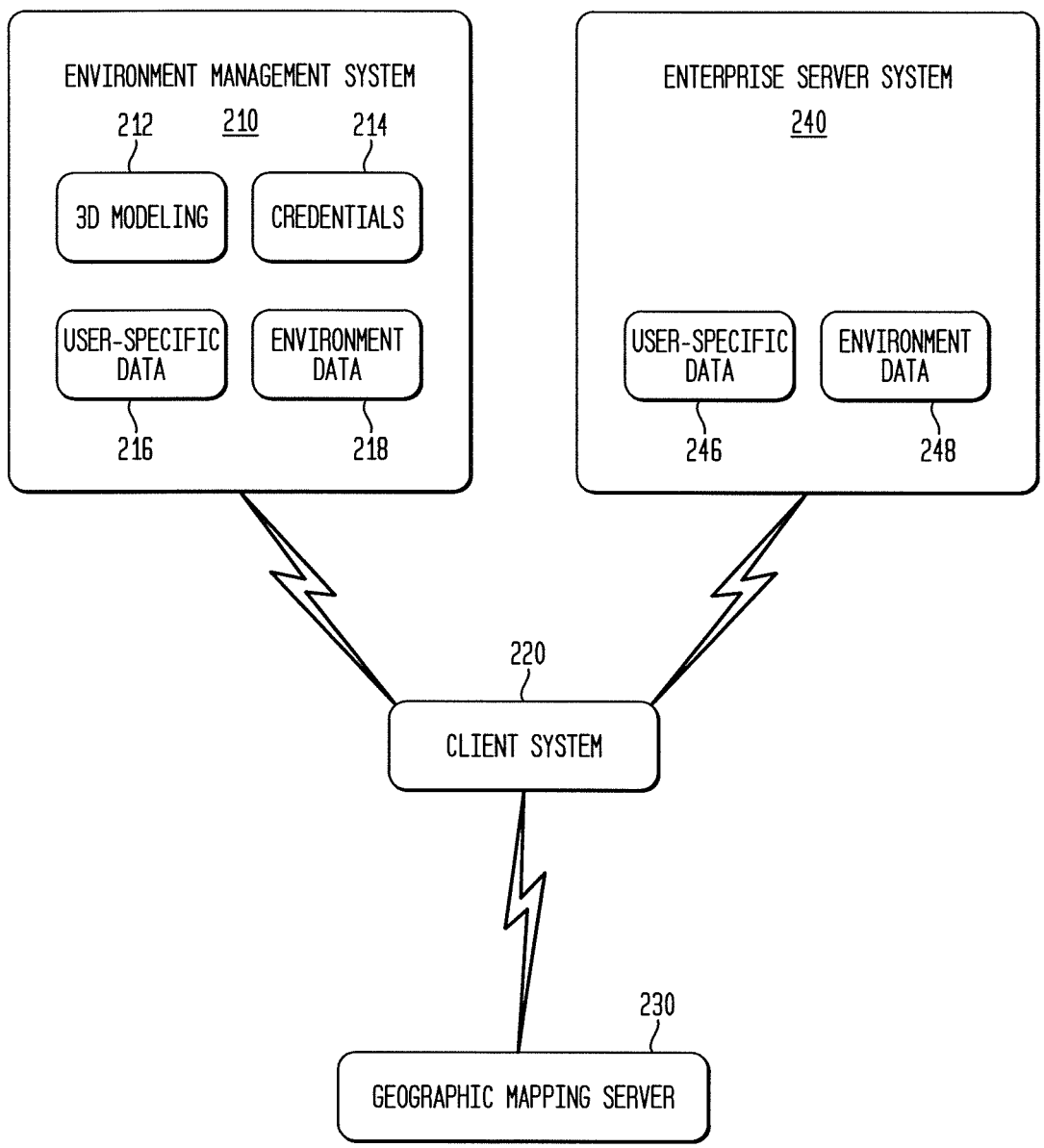
FIG. 2 shows a simplified diagram of an environment management system and other systems in accordance with disclosed embodiments.

FIG. 2 shows a simplified diagram of an environment management system 210 and other systems in accordance with disclosed embodiments, that communicate with a client system 220. Either of these systems can be implemented as one or more data processing systems 100, and in particular, environment management system 210 and enterprise server system 240 can be implemented as a number of different physical systems, located together or apart, that together perform processes as described herein.

"Facility" is used herein in the wide sense of the word, and can include, for instance, an office building, an airport, a mall, a production site, an oil rig, a wind-mill, a transformer sub-station, a chemical plant, a vehicle factory, etc. "Asset" can include, for example, machines, shipping and handling systems, furniture, piping, etc. These facilities, the assets in the facilities, and the geographical context in which they appear can be generated into a 3D environment by 3D modeling 212 of environment management system 210, and the 3D environment can be sent for display on client system 220.

Note that, in some embodiments, client system 220 can also communicate with a geographic mapping server 230. Geographic mapping server can store, generate, and transmit to the client non-proprietary geographic information, and can be implemented using a system such as the "Google Earth" geographic mapping system. In this way, the basic publicly-available data need not be stored or maintained in environment data 218 on environment management system 210. Instead, in various embodiments, environment management system 210 stores and maintains user and company-specific data in environment data 218 and user-specific data 216, under the control of credentials 214, and 3D modeling 212 publishes appropriate data to be viewed in the 3D context produced by the geographic mapping server 230.

Disclosed embodiments can associate information from various data sources to the 3D and geographical context. In various specific embodiments, data sources can include one or more enterprise server systems 240, that can also maintain user-specific data 246 and environment data 248. This environment data 248 can include, for example, such as reports, queries, or portal information, Internet web sites, and ad-hoc electronic documents such as Portable Document Format (PDF) files, HTML or other markup-language files, pictures, and multimedia data. This information can be accessed through visual tags showed in the 3D environment, such as by icons overlaid on objects in the 3D environment. These visual tags are referred to herein as "placemarks." Any of this data can be stored and maintained in environment management system 210 as environment data 218, and user-specific placemarks can be stored and maintained as user-specific data 216. Similarly, any of this data can be stored and maintained in enterprise server system 240 as environment data 248, and user-specific placemarks can be stored and maintained as user-specific data 246.

In various embodiments, enterprise server system(s) 240 can be maintained and controlled by, for example, a third-party business or other enterprise, and the employees of that enterprise can add, change, and update the data stored on that system. As described in more detail below, environment management system 210 can control and direct access to the data on enterprise server system 240 according to credentials 214.

A wide range of information can be associated, in various embodiments, to be retrieved or displayed when selected in the 3D environment. Various information can be manually associated to the system; for example, a user can choose an information source and manually create a placemark. Information can be manually updated or removed from the system. Updating can include changes of geographical position, of the displayed information, or of the information source. The user can manually add, change, and position 3D model(s). If and when the 3D model comes from a library, it can bring with it additional associated information besides the 3D geometry, as described in more detail herein. Any of the manual updates can also be automated or performed by the system automatically without manual intervention. These libraries and other data can be stored as part of the environment data 218, and the system can update environment data 218 via an interaction with client system 220 (and the user of client system 220).

The information can be associated and formatted via pre-defined templates maintained by environment management system 210 or enterprise server system 240. A pre-defined template can define the display form of a placemark and the data fields common for all placemarks using that template. The user can manually create a placemark based on a template and fill the specific information, by interacting with client system 220, which itself communicates with environment management system 210 or enterprise server system 240. These placemarks and templates can also be stored and maintained in environment data 218 or 248.

The information can be bulk-loaded into the system and can be added, updated, or deleted in bulk through an API or other import/export mechanism. For example, the system can import spreadsheet file or an XML formatted file with many information elements and can store these in environment data 218 or 248.

Once received by the system, the information can be automatically associated with the appropriate populated 3D models by the system, and can be used to create placemarks.

The information is secure and access can be controlled based on enterprise access control models, according to credentials 214. The information can also be dynamically included in or excluded from in the 3D environment based on various conditions, such as according to specific times and dates. The system can use credentials 214 to determine which users are able to access and see which data at any specific time, whether the particular data is located on environment management system 210 or enterprise server system 240.

Credentials 214 can be implemented in one or more directory servers. These directory servers can perform such functions as managing customer users, authentication, access roles, and user definitions and groups. The directory servers can import user definitions and groups.

Credentials 214 can implement role-based access control (RBAC). Roles can be defined based on basic actions for specific types, and can be aggregated in groups. Roles can be assigned to users or user groups. Granularity can be based on scope (e.g. site/zone/layer) and particular objects (e.g. place mark or 3D model).

For example, the credentials 214 could specify that a member of a particular site cannot modify information in another site, or that a user in a specific group cannot open placemarks on a specific layer or even a specific placemark.

Various embodiments can also perform information scoping functions. In various embodiments, the information including 3D information, placemarks, and other data can be categorized into a logical hierarchy of layers. This information can also be categorized based on facilities and zones (sub-areas) within those facilities, e.g. a plant in Munich versus a plant in London can be represented as two facilities, where the Munich Plant might have three zones such as Paint, Press, and Warehouse. These layers and categorizations can be stored in environment data 218 or 248, when they are intended to be accessed by multiple users, or can be stored as user-specific data 216 or 246.

Various embodiments provide multiple ways for a user to access the system. In various embodiments, the system can be accessed via a web client with minimal IT footprint or via a mobile application, and can be implemented or accessed using a data processing system 100. The exemplary client system 220 is intended to include any of these devices.

The user's interaction with the system can be implemented through simple and intuitive user interfaces, such as on client system 220. The system can provide the user visual navigation in the 3D environment, using inputs such as a mouse, keyboard, or touch screen on client system 220. The system can allow the user to access information via the placemark visual tags showed in the 3D environment. When the system receives a selection of a placemark from a user, it can respond by displaying additional information associated with that placemark on the client system 220 from system 210 or system 240.

The system can store and re-use "viewpoints" selected by a user, and return to a pre-defined view in the 3D environment when the user selects the associated viewpoint. These viewpoints can be stored as user-specific data 216.

In various embodiments, the system provides a collaborative working environment for publishing information. The system can receive and maintain user comments on information published in the system. The system can manage subscriptions for specific users and send notifications of information that is added, removed, or changed based on the individual user or the user's role or task as defined by the user credentials. The system can display, in the environment data 218, environment data 248, or otherwise, the recent information that was added, removed, or changed, and the time and date of the change.

The system can enable multiple users to "co-browse" the system, i.e., jointly navigate through the system, by communicating with multiple client systems 220 at a time. In such a session users can create interactive markups to highlight certain areas or locations. The system can interact with users to create virtual tours, such as predefined paths, viewpoints and invocation of placemarks, including duration of movement and time spent at each location.

According to various embodiments, the system enables the user to search the information associated in the system, by searching environment data 218 or 248 and user-specific data 216 or 246, subject to the user's credentials 214. Information searched can include placemarks, 3D information, viewpoints, and other data. The system can display the search results, and can receive input from the user to identify the information type (e.g. placemark vs. viewpoint) and, in response to a user input, the system can "fly to" the relevant element. If the searched element is not currently loaded, the system can retrieve and display it.

According to various embodiments, the system can associate information to other IT systems. For example, identification of the system's data elements can be recognized by other systems and vice versa.

Various embodiments of the system allow to "fly to" the element through a programmatic interface, meaning to quickly travel though the 3D environment to the selected element. Various embodiments of the system can invoke other applications with the data identification relevant to those applications. In order to ease the 3D navigation through the facilities and to direct users to specific location in the facilities, the system can define "walking paths" across the facilities, independently or via an interaction with a user. A path can be comprised of connected lines in space. Once a path is selected by the user, the 3D navigation can be confined to the direction and altitude of the path. Some embodiments support a "walking mode" which allows the user to navigate the 3D environment on a constant altitude level with consideration of 3D obstacles, as the 3D environment is generated and rendered by 3D modeling 212.

In other cases, 3D modeling 212 can generate, format, and arrange the appropriate data to be transmitted to client system 220, which itself performs the 3D rendering, including using data provided by geographic mapping server 230. In this way, client system 220 can produce the integrated 3D environment using data from environment management system 210, enterprise server system 240, and geographic mapping server 230, without duplicating data such as basic 3D geographic information.

In various embodiments, the system can be implemented as an enterprise cloud solution, such as a "software as a service" (SaaS), in desktop or mobile data processing systems, or in other data processing systems.

Various embodiments can use a global resource library, which can be stored in environment data 218 or 248. The system can define 3D elements that have some logical meaning (e.g. a pump or a conveyor) with associated information that can be mapped to logical layers. These objects can be organized in a library based on different categorizations. The library is searchable, and preferably any contribution to the libraries is subject to moderation by the system provider, for example on the basis of compliance, technical aspects, etc.

In various embodiments, the environment data 218 and 248, and user-specific data 216 and 246, can be stored in multiple databases or database servers. For example, each customer or user can have a separated database with customizable schema.

Other users, OEMs, or other entities can contribute models of their products to the library, with or without royalties/fees. Access to library elements can be restricted based on the enterprise, different communities, etc. Users can access this library, choose relevant objects, and use them according to the license terms. The objects can appear in the 3D and can inherit some or all of the associated information, which can be managed using the layers described herein.

Various embodiments manage a 3D representation of a factory or other facility, and allows the user to navigate through it in a simple and intuitive way. Various embodiments can present production relevant information in its geographical context and allow people to easily communicate and interact around the 3D model. Various embodiments also use Web 2.0 techniques, allowing end users to generate some of the content in a virtual community.

Various embodiments can be implemented as a web application that has an almost zero IT footprint, and that allows users to view and navigate through a 3D model of the factory using client system 220. On top of the 3D, a user can access various layers of factory related information, such as quality reports or machine manuals. These layers can be turned on and off, and when turned on, the information appears, with info-tags or place-marks, in its geographical relevant position.

Disclosed embodiments allow users to share the factory information, making it available and accessible to many people, and allowing people to share their data, their thoughts with the community. Thus, an employee or user can add information, suggest improvement or simply see what his colleagues have added, depending on his user credentials and associated permissions.

A virtual facility as disclosed herein can be used for many collaborative tasks such as factory virtual tours, virtual inspections, customer visits, employee education and training, process monitoring, and more.

Various embodiments allow 3D factory modeling and navigation of the factory in 3D. Various embodiments present facility information in simple and intuitive 3D, with information layers from multiple sources and stored in environment data 218. For example, various implementations can have a layer showing the machine information (manufacturer, model, manuals), or a layer showing a live camera feed from the factory.

Figure 3:
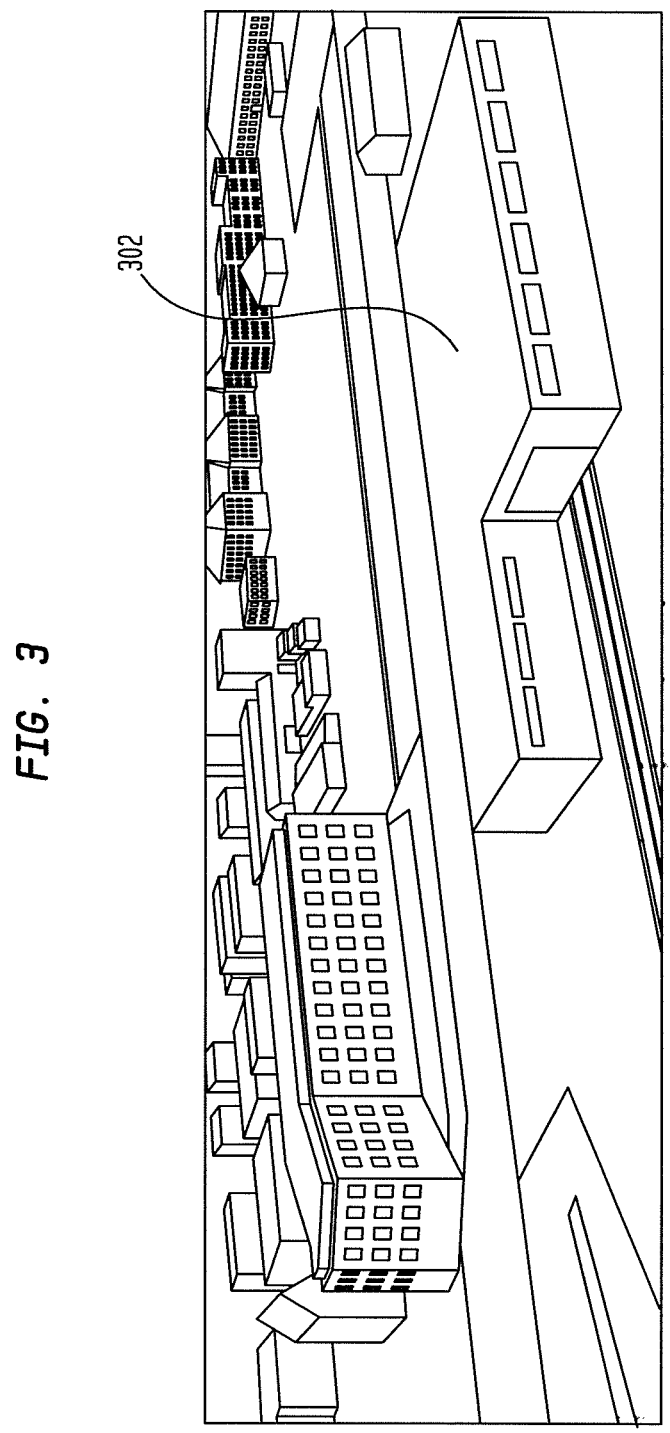
FIG. 3 shows an example of a 3D geographic environment that can be produced by an environment management system or a geographic mapping server for display on client system in accordance with disclosed embodiments.

FIG. 3 shows an example of a 3D geographic environment that can be produced by environment management system 210 and/or geographic mapping server 230 for display on client system 220. Assume, in this case, that factory 302 is the indicated building/facilities, and that the user wishes to obtain more information about the assett and layout of those facilities.

Figure 4:
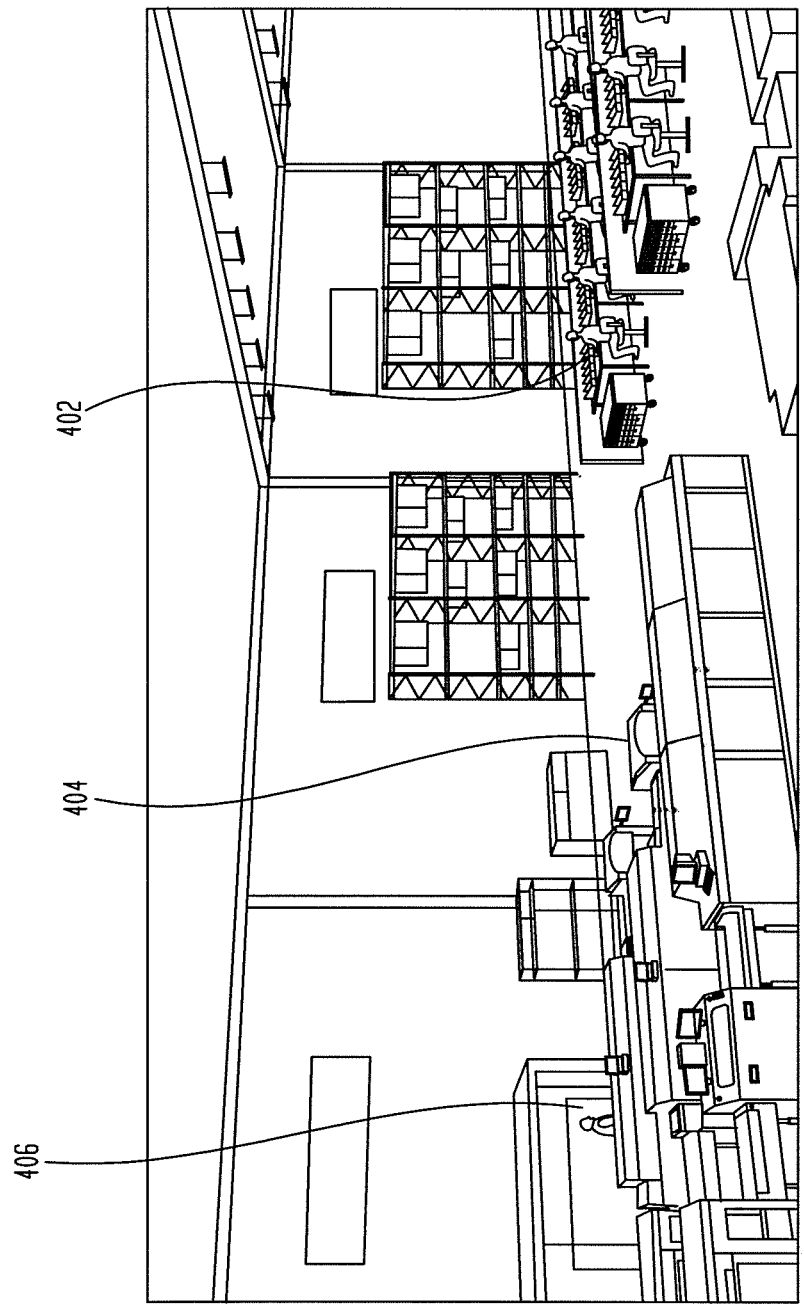
FIG. 4 shows an example of a 3D environment of a facility, including its assets, in accordance with disclosed embodiments.

FIG. 4 shows an example of a 3D environment of a facility corresponding to factory 302, including its assets. Note that FIG. 4 shows a 3D representation of the actual physical layout of the facility and its assets. The system can interact with the user with regard to the displayed assets. For example, if the system receives a user selection of workstation 402, the system can display such information as the function of the workstation, the employee assigned to the workstation, metric and production data for the work station, and other information. Similarly, if the system receives a user selection of press 404, the system can display such information as the status of the press, manuals and troubleshooting information for the press, metric and production data for the press, and other information. This figure also illustrates a placemark 406.

Figure 5:
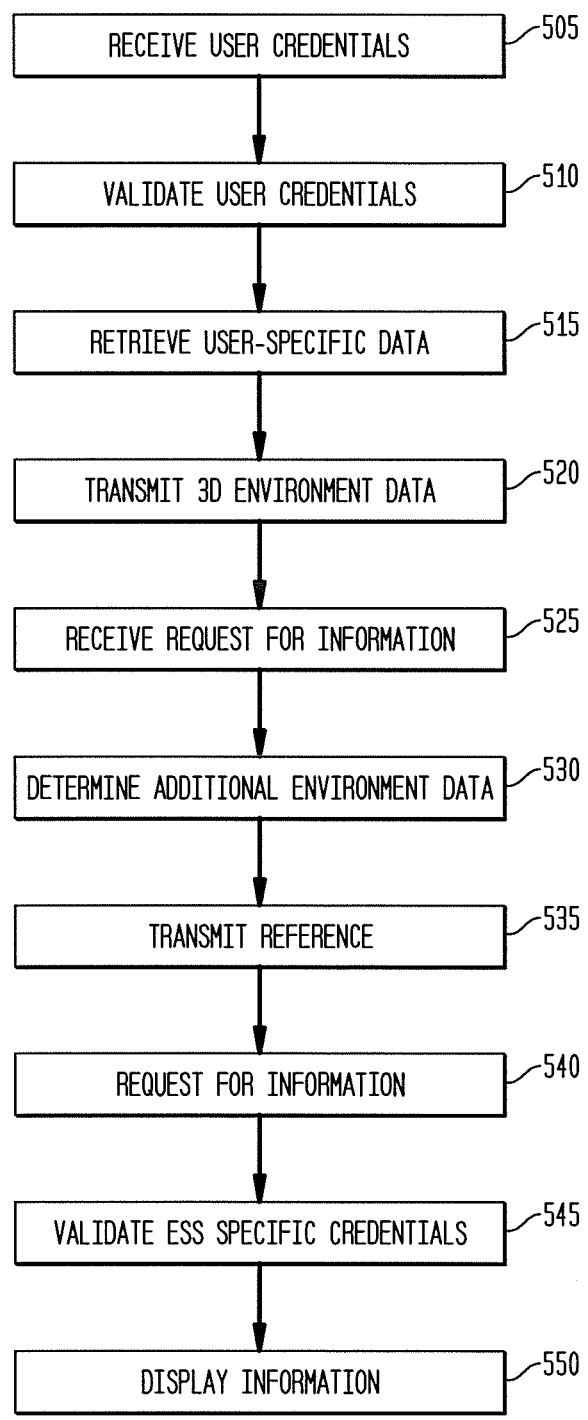
FIG. 5 depicts a flowchart of a process in accordance with disclosed embodiments.

FIG. 5 depicts a flowchart of a process in accordance with disclosed embodiments. In this example, the process is performed by an environment management system (EMS), such as environment management system 210, that "points to" or references data stored on an enterprise server system (ESS) such as enterprise server system 240, to provide a virtual environment as described herein to a user of a client system.

The EMS receives, from a client system, user credentials (step 505). The user credentials can include, for example a username, password, biometric credentials, or other information sufficient to identify the user.

The EMS validates the user credentials (step 510).

Based on the validated user credentials, the EMS retrieves user-specific data (step 515). The user specific data can include, for example, placemarks and viewpoints as described herein, and can include references to other user-specific data stored on the ESS.

Based on the validated user credentials and the user-specific data, the EMS system transmits 3D environment data to the client system 220 (step 520). In various embodiments, the 3D environment data can include data sufficient for the client system to render a 3D environment on its own, or can include data sufficient for the client system to render the 3D environment through an interaction with a geographic mapping server that provides additional data. In response to receiving the 3D environment data, the client system will display a 3D environment of a facility and its assets. The 3D environment data, in various embodiments, only includes those facilities and assets that are permitted to be displayed to the user according to the validated user credentials. The 3D environment data can include the user-specific data.

The EMS system can receive a request for information regarding an asset of the 3D environment data (step 525). This request can be transmitted, for example, from the client system in response to a user selecting an asset for more information.

The EMS system determines, based on the validated user credentials, additional environment data on the ESS that corresponds to the received request (step 530). In particular, this environment data can be limited based on the user credentials, including role-based access controls, and other limits to particular users, roles, and groups, as specified by the user credentials. The additional environment data can include reports, machine manuals, reports, queries, portal information, Internet web sites, ad-hoc electronic documents, pictures, multimedia files, and real-time operational data of an asset.

The EMS system transmits, to the client system, a reference to the additional environment data on the ESS (step 535). This reference can be a uniform resource locator, a reference to a specific file or image, a token by which the ESS can reference the data, or otherwise.

The client system can then use the reference to request and receive the additional environment data for display (step 540). As part of or before delivery of this information to the client, the particular ESS can perform specific credential verification (step 545). The EMS system can then instruct the client system to render and display the information on the client system in the 3D environment (step 550). In other embodiments, the ESS system can transmit this reference to the EMS via client, which then retrieve the additional environment data to the client system. Display on the client system can include "flying" to relevant data or asset in the 3D environment.

A process such as that described in the example of FIG. 5 can be used to create and display the 3D environment of the facility and its asset on the client system. When the user requests more information about an asset (or the facility itself), the EMS can perform the authentication and access-control tasks necessary to ensure that the client system can only retrieve and display the appropriate information from the ESS, based on the user's credentials.

The information (3D and any other) can be tagged with a specific time in past or future that the information is effective. The user can then display the 3D environment with associated placemarks as it should be at any specific time, for assessment and sharing with other users. That is, in some cases, at least a portion of the additional environment data has an associated effective date or time, and the client system displays the additional environment data that has an associated effective date that corresponds to a user-specified date or time.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of executable instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives, and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by an environment management system (EMS), comprising:
    receiving, from a client system, user credentials;
    validating the user credentials;
    retrieving user-specific data corresponding to the validated user credentials;
    transmitting three-dimensional (3D) environment data to the client system based on the validated user credentials and the user-specific data;
    receiving a request for information regarding an asset of the 3D environment data;

determining, based on the validated user credentials, additional information corresponding to the asset of the 3D environment data, the additional information located on an enterprise server system (ESS); and transmitting, to the client system, a reference to the additional information on the ESS, wherein the reference can be used by the client system to retrieve the additional information from the ESS for display on the client system, wherein at least a portion of the additional information has an associated effective date, and the client system displays the additional information that has an associated effective date that corresponds to a user-specified date.

2. The method of claim 1, wherein the client system combines the 3D environment data with data from a graphic mapping server to produce a simulated 3D environment display.

3. The method of claim 1, wherein the 3D environment data includes data relating to a facility and a plurality of assets of that facility, and is organized into selectable logical layers.

4. The method of claim 1, wherein the user-specific data includes at least one placemark.

5. The method of claim 1, wherein the user-specific data includes at least one viewpoint.

6. The method of claim 1, wherein the request for information is received from the client system, which transmits the request in response to a user selection of the asset.

7. The method of claim 1, wherein the additional information includes at least one of reports, machine manuals, queries, portal information, Internet web sites, ad-hoc electronic documents, pictures, multimedia files, and real-time operational data of the asset.

8. An environment management system (EMS), comprising:
   at least one processor;
   an accessible memory; and
   a network communication device, the EMS configured to
   receive, from a client system, user credentials;
   validate the user credentials;
   retrieve user-specific data corresponding to the validated user credentials;
   transmit three-dimensional (3D) environment data to the client system based on the validated user credentials and the user-specific data;
   receive a request for information regarding an asset of the 3D environment data;
   determine, based on the validated user credentials, additional information corresponding to the asset of the 3D environment data, the additional information located on an enterprise server system (ESS); and
   transmit, to the client system, a reference to the additional information on the ESS, wherein the reference can be used by the client system to retrieve the additional information from the ESS for display on the client system, wherein at least a portion of the additional information has an associated effective date, and the client system displays the additional information that has an associated effective date that corresponds to a user-specified date.

9. The EMS of claim 8, wherein the client system combines the 3D environment data with data from a graphic mapping server to produce a simulated 3D environment display.

10. The EMS of claim 8, wherein the 3D environment data includes data relating to a facility and a plurality of assets of that facility, and is organized into selectable logical layers.

11. The EMS of claim 8, wherein the user-specific data includes at least one placemark.

12. The EMS of claim 8, wherein the user-specific data includes at least one viewpoint.

13. The EMS of claim 8, wherein the request for information is received from the client system, which transmits the request in response to a user selection of the asset.

14. The EMS of claim 8, wherein the additional information includes at least one of reports, machine manuals, queries, portal information, Internet web sites, ad-hoc electronic documents, pictures, multimedia files, and real-time operational data of the asset.

15. A non-transitory computer-readable medium encoded with executable instructions which, when executed, cause an environment management system (EMS) to:
   receive, from a client system, user credentials;
   validate the user credentials;
   retrieve user-specific data corresponding to the validated user credentials;
   transmit three-dimensional (3D) environment data to the client system based on the validated user credentials and the user-specific data;
   receive a request for information regarding an asset of the 3D environment data;
   determine, based on the validated user credentials, additional information corresponding to the asset of the 3D environment data, the additional information located on an enterprise server system (ESS); and
   transmit, to the client system, a reference to the additional information on the ESS, wherein the reference can be used by the client system to retrieve the additional information from the ESS for display on the client system, wherein at least a portion of the additional information has an associated effective date, and the client system displays the additional information that has an associated effective date that corresponds to a user-specified date.

16. The computer-readable medium of claim 15, wherein the 3D environment data can be combined by the client system with data from a graphic mapping server to produce a simulated 3D environment display.

17. The computer-readable medium of claim 15, wherein the 3D environment data includes data relating to a facility and a plurality of assets of that facility, and is organized into selectable logical layers.

18. The computer-readable medium of claim 15, wherein the user-specific data includes at least one placemark.

19. The computer-readable medium of claim 15, wherein the user-specific data includes at least one viewpoint.

20. The computer-readable medium of claim 15, wherein the request for information is received from the client system, which transmits the request in response to a user selection of the asset.

21. The computer-readable medium of claim 15, wherein the additional information includes at least one of reports, machine manuals, queries, portal information, Internet web sites, ad-hoc electronic documents, pictures, multimedia files, and real-time operational data of the asset.

* * * * *